(12) United States Patent
Yamashiro

(10) Patent No.: US 10,332,371 B2
(45) Date of Patent: Jun. 25, 2019

(54) IDENTIFICATION SYSTEM

(71) Applicant: DENSO CORPORATION, Kariya, Aichi-pref. (JP)

(72) Inventor: Takahisa Yamashiro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/078,771

(22) PCT Filed: Jan. 24, 2017

(86) PCT No.: PCT/JP2017/002210
§ 371 (c)(1),
(2) Date: Aug. 22, 2018

(87) PCT Pub. No.: WO2017/145608
PCT Pub. Date: Aug. 31, 2017

(65) Prior Publication Data
US 2019/0051128 A1  Feb. 14, 2019

(30) Foreign Application Priority Data

Feb. 26, 2016  (JP) ................... 2016-035989

(51) Int. Cl.
*G08B 13/00* (2006.01)
*G08B 13/22* (2006.01)
(Continued)

(52) U.S. Cl.
CPC ......... *G08B 13/22* (2013.01); *G07C 9/00087* (2013.01); *G08B 13/19* (2013.01);
(Continued)

(58) Field of Classification Search
CPC ............... G08B 13/22; G07C 9/00087
(Continued)

(56) References Cited

U.S. PATENT DOCUMENTS 5,455,807 A  * 10/1995 Nepple ............. G04G 9/0076
368/21
8,462,704 B2  6/2013 Hu
(Continued)

FOREIGN PATENT DOCUMENTS

JP  2003135254 A  5/2003
JP  2005173678 A * 6/2005
(Continued)

*Primary Examiner* — Tanmay K Shah
(74) *Attorney, Agent, or Firm* — Harness, Dickey & Pierce, P.L.C.

(57) ABSTRACT

An identification system includes a facility-side device and a transmitter which is carried by a registered individual and transmitting an identification signal containing identification information. The facility-side device includes: an identification signal receiving device receiving the identification signal transmitted from the transmitter; an identification information storage unit in which identification information assigned to the transmitter carried by the registered individual is previously stored; an event detection unit detecting an occurrence of an event; and an individual identification unit determining whether the individual present in the detection area is the registered individual by comparing the identification information, which is exhibited by the identification signal received during a detection time zone, with the identification information stored in the identification information storage unit. The detection time zone is determined according to a detection time of the occurrence of the event and includes at least the detection time of the occurrence of the event.

5 Claims, 8 Drawing Sheets

(51) Int. Cl.
  *G08B 13/19* (2006.01)
  *G08B 25/04* (2006.01)
  *G08B 25/08* (2006.01)
  *H04M 11/00* (2006.01)
  *G07C 9/00* (2006.01)
  *H04M 11/04* (2006.01)

(52) U.S. Cl.
  CPC ............ *G08B 25/04* (2013.01); *G08B 25/08* (2013.01); *H04M 11/00* (2013.01); *H04M 11/04* (2013.01)

(58) Field of Classification Search
  USPC ........................................................ 340/541
  See application file for complete search history.

(56) References Cited

U.S. PATENT DOCUMENTS

| | | | | |
|---|---|---|---|---|
| 2004/0199785 A1* | 10/2004 | Pederson | ........... | G07C 9/00158 340/293 |
| 2011/0065452 A1* | 3/2011 | Noonan | ........... | G01S 5/02 455/456.1 |
| 2011/0092245 A1* | 4/2011 | Noonan | ........... | H04W 48/04 455/528 |
| 2014/0266720 A1* | 9/2014 | McGowan | ........... | A63B 69/0048 340/541 |
| 2015/0061869 A1* | 3/2015 | Crowe | ........... | G08B 15/02 340/541 |
| 2016/0055692 A1* | 2/2016 | Trani | ........... | G07C 9/00007 340/5.61 |
| 2016/0148449 A1* | 5/2016 | God | ........... | G07C 9/00087 340/5.6 |
| 2017/0010592 A1* | 1/2017 | Wiechers | ........... | G07C 9/00857 |

FOREIGN PATENT DOCUMENTS

| | | | |
|---|---|---|---|
| JP | 2005292921 A | | 10/2005 |
| JP | 2007133693 A | * | 5/2007 |
| JP | 2009271638 A | * | 11/2009 |
| JP | 2010102482 A | | 5/2010 |
| JP | 5443110 B2 | | 3/2014 |
| JP | 2015201187 A | * | 11/2015 |

* cited by examiner

IDENTIFICATION SYSTEM

CROSS REFERENCE TO RELATED APPLICATIONS

This application is a U.S. National Phase Application under 35 U.S.C. 371 of International Application No. PCT/JP2017/002210 filed on Jan. 24, 2017 and published in Japanese as WO/2017/145608 A1 on Aug. 31, 2017. This application is based on and claims the benefit of priority from Japanese Patent Application No. 2016-035989 filed on Feb. 26, 2016. The entire disclosures of all of the above applications are incorporated herein by reference.

TECHNICAL FIELD

The present disclosure relates to an identification system identifying whether an individual present in a predetermined area within a facility is a pre-registered individual or whether a delivered package is a package dispatched from a trusted sender.

BACKGROUND ART

A security system disclosed in, for example, Patent Literature 1 notifies to an outside by activating an alarm upon detection of intrusion of a suspicious individual into a facility, such as a home.

A security system disclosed in Patent Literature 2 identifies whether a visitor is an authenticated delivery person by comparing a face image of the visitor captured by a camera with a pre-registered face image of the delivery person. A technique of identifying whether a visitor is a pre-registered individual by comparing face images is popular as a face recognition technology.

PRIOR ART LITERATURES

Patent Literatures

Patent Literature 1: JP 2010-102482 A
Patent Literature 2: JP 5443110 B

SUMMARY OF INVENTION

The technique disclosed in Patent Literature 1 has an inconvenience that the alarm supposed to be activated upon detection of intrusion of a suspicious individual may also be activated erroneously upon detection of a resident who returns home. Such an erroneous alarm activation is attributed to an incapability of identifying whether an individual detected by a sensor or the like (hereinafter, referred to as a detected person) is an individual who does not need an alarm activation, such as a family member, or an individual (intruder) who needs to be notified to the outside.

The above inconvenience may be overcome by registering face images of residents beforehand. Whether the detected person is any one of pre-registered individuals (residents) can be identified by checking a face of the detected person against the registered face images of the residents. However, a successfully captured face image of the detected person is a precondition to prevent an erroneous alarm activation by the method as above and the residents have to turn faces to a camera, which the residents may find burdensome. In addition, introduction of a system that identifies persons entering the facility by face recognition processing requires a cost in term of equipment such as a camera.

In a case where an object of the security system is to identify whether an individual visiting the facility as a delivery person is an authenticated delivery person among a wide variety of visitors, whether someone entering the facility is a pre-registered individual can be identified by the configuration disclosed in Patent Literature 2. However, the configuration disclosed in Patent Literature 2 includes a camera and therefore requires a high cost.

Moreover, whether a package delivered by the delivery person is a suspicious package is unknown unless the package is actually opened.

In view of the foregoing difficulties, it is an object of the present disclosure to provide an identification system capable of identifying, without a camera, whether an individual present in a predetermined area within a facility is a pre-registered individual or whether a delivered package is a package dispatched from a trusted sender.

According to an aspect of the present disclosure, an identification system identifying whether an individual present in a predetermined region is a registered individual who is preliminarily registered is provided. The predetermined region is a detection area set within a facility. The identification system includes a facility-side device installed to the facility and a transmitter carried by the registered individual. The transmitter transmits an identification signal containing identification information using a radio wave of a predetermined frequency band. The facility-side device includes: an identification signal receiving device configured to receive the identification signal transmitted from the transmitter present within the detection area; an identification information storage unit in which identification information assigned to the transmitter carried by the registered individual is previously stored; an event detection unit detecting an occurrence of an event, the event triggering a processing which determines whether an individual present in the detection area is the registered individual; and an individual identification unit determining whether the individual present in the detection area is the registered individual by comparing the identification information, which is exhibited by the identification signal received by the identification signal receiving device during a detection time zone, with the identification information stored in the identification information storage unit, the detection time zone being determined with reference to a detection time of the occurrence of the event detected by the event detection unit and the detection time zone including at least the detection time of the occurrence of the event.

According to the configuration as above, the registered individual carries the transmitter transmitting the identification signal exhibiting the identification information. The identification information assigned to the transmitter carried by the registered individual is registered in the identification information storage unit included in the facility-side device.

When the event detection unit detects an occurrence of a predetermined event, the individual identification unit compares the identification information exhibited by the identification signal received by the identification signal receiving device during the detection time zone determined with reference to an occurrence time of the event with the identification information registered in the identification information storage unit.

The identification information contained in the identification signal received by the identification signal receiving device during the detection time zone functions as information identifying the transmitter present within the detection area at the occurrence time of the event.

In a case where the registered individual is present in the detection area at the occurrence time of the event, the identification signal receiving device receives the identification signal exhibiting the registered identification information during the detection time zone. Meanwhile, in a case where the registered individual is not present in the detection area at the occurrence time of the event, the identification signal receiving device does not receive the identification signal from the transmitter carried by the registered individual.

Hence, by comparing the identification information exhibited by the identification signal received by the identification signal receiving device during the detection time zone with the identification information registered in the identification information storage unit, whether an individual present in the detection area is the registered individual can be identified.

Further, the above configuration does not require a camera. That is, according to the configuration as above, whether an individual present in a predetermined area is a pre-registered individual can be identified without using a camera.

According to another aspect of the present disclosure, an identification system employed in a facility and identifying whether a package delivered to the facility by a delivery person is a good notified beforehand by an authenticated sender is provided. The identification system includes a facility-side device installed to the facility, and a transmitter attached to an authenticated package which is a package dispatched from the authenticated sender. The transmitter transmits an identification signal containing identification information using a radio wave of a predetermined frequency band. The facility-side device includes: an identification signal receiving device configured to receive the identification signal transmitted from the transmitter present within a predetermined placement area; an expected package storage unit in which identification information assigned to the transmitter attached to the authenticated package is registered; an event detection unit detecting, as an occurrence of an event, a placement of the package within the placement area; a package identification unit determining whether the package placed within the placement area is the authenticated package by comparing the identification information, which is exhibited by the identification signal received by the identification signal receiving device during a detection time zone, with the identification information stored in the expected package storage unit, the detection time zone being determined with reference to a detection time of the occurrence of the event and the detection time zone including at least the detection time of the occurrence of the event; and a notification processing unit notifying a user that the package is the authenticated package in a case where the package identification unit determines that the package is the authenticated package, the notification processing unit further notifying the user that the package is not the authenticated package in a case where the package identification unit determines that the package is not the authenticated package.

According to the configuration as above, the transmitter transmitting the identification signal exhibiting predetermined identification information is attached to an authenticated package which is a good dispatched from a trusted sender, and the identification information assigned to the transmitter attached to the authenticated package is previously registered in the expected package storage unit included in the facility-side device.

When the event detection unit detects an occurrence of the event that the package is placed within the placement area, the package identification unit compares the identification information exhibited by the identification signal received by the identification signal receiving device during the detection time zone determined with reference to the occurrence time of the event with the identification information registered in the expected package storage unit.

In a case where the package present in the placement area is the authenticated package, the identification signal receiving device receives the identification signal exhibiting the identification information that matches the identification information registered in the expected package storage unit during the detection time zone. Meanwhile, in a case where the package placed in the placement area is not the authenticated package, the identification signal receiving device does not receive the identification signal exhibiting the identification information stored in the identification signal storage unit.

Hence, by comparing the identification information exhibited by the identification signal received by the identification signal receiving device during the detection time zone with the identification information registered in the expected package storage unit, whether the package placed in the placement area is the authenticated package can be identified. According to the configuration as above, by placing a package delivered by a delivery person in the placement area, whether the package delivered by the delivery person is a package from a trusted sender can be identified.

Further, the above configuration does not require a camera. That is, according to the configuration as above, whether a packaged delivered by a delivery person is a package from a trusted sender can be identified without using a camera.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

First Embodiment

Hereinafter, a first embodiment will be described with reference to the drawings. A crime prevention system 100 of the present embodiment is a system which detects intrusion of a suspicious individual into a predetermined facility and notifies to a predetermined point of contact about intrusion of a suspicious individual upon detection of intrusion of the suspicious individual. The crime prevention system 100 is applicable to various types of facilities, such as commercial buildings, public offices, banks, museums, natural parks, and individual houses or residences. The crime prevention system 100 may notify to the police, a security company, or a facility manager, or call on a cellular phone of a resident.

Figure 1:
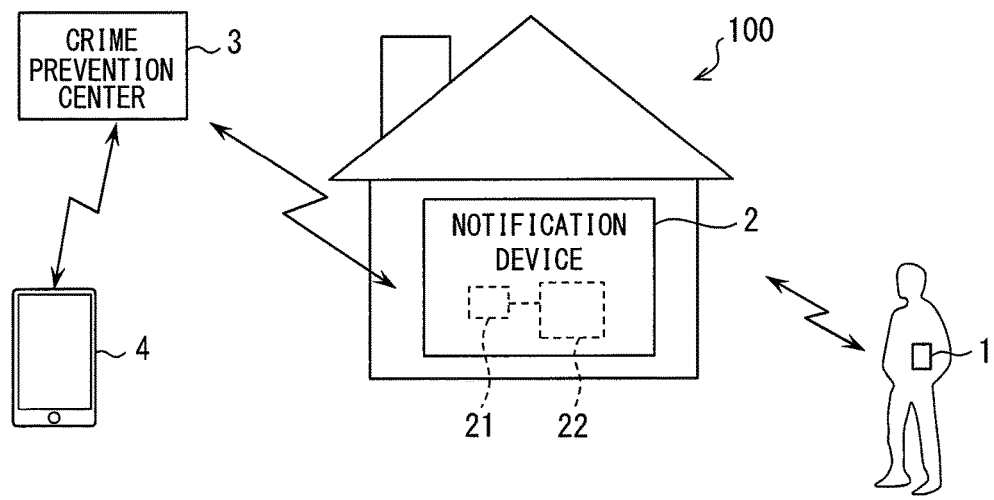
FIG. 1 is a block diagram showing a schematic configuration of a crime prevention system according to a first embodiment.

As is shown in FIG. 1, the crime prevention system 100 includes a wireless tag 1 carried by a user, a notification device 2 installed to a facility under protection of the crime prevention system 100, a crime prevention center 3 managed by a business owner providing the crime prevention system 100, and a wide area communication terminal 4 carried by the user. More in detail, the notification device 2 includes a human sensing sensor 21 and an identification unit 22. The user referred to herein means an individual authorized to access a facility installed with the notification device 2.

FIG. 1 shows only one wireless tag 1. However, two or more wireless tags 1 may be provided. Herein, assume that the crime prevention system 100 is used by two or more users and therefore two or more wireless tags 1 are provided. Also, two or more wide area communication terminals 4 may be provided.

The following will describe a case where the notification device 2 is installed to an individual house where a family of four resides as an example. Each family member residing in the individual house corresponds to a user.

Configuration of Wireless Tag 1

A configuration of the wireless tag 1 will now be described. The wireless tag 1 is attached to a bag, a shoe, or the like or put in a garment pocket or the like and carried by the user. A unique, non-duplicable identification number (hereinafter, referred to as a tag ID) is pre-registered in each wireless tag 1. The wireless tag 1 corresponds to a transmitter.

Figure 2:
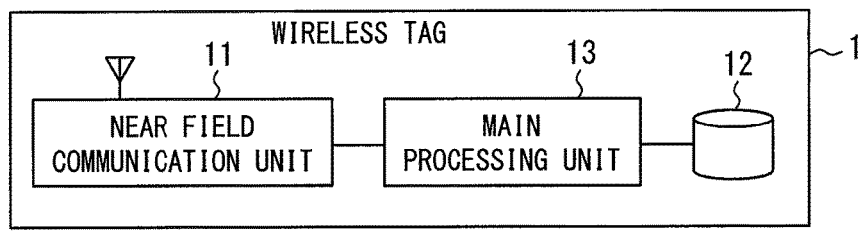
FIG. 2 is a block diagram showing a schematic configuration of a wireless tag.

As is shown in FIG. 2, the wireless tag 1 includes a near field communication unit 11, a memory 12, and a main processing unit 13. The main processing unit 13 is capable communicating individually with the near field communication unit 11 and the memory 12.

The near field communication unit 11 is a communication module in compliance with predetermined communication standards and making wireless communication without using a wide area communication network (hereinafter, referred to as near field communication). Communication standards, such as IEEE802.11 and IEEE802.15.1 standards, may be adopted to realize the near field communication. It is preferable to adjust transmission power of the near field communication unit 11 for a transmitted identification signal to propagate over a distance up to several tens of meters while maintaining a signal level receivable by other communication terminals.

More in detail, the near field communication unit 11 includes a near field communication antenna and a transceiver portion, neither of which is shown. The near field communication antenna is an antenna to transmit and receive a radio wave in a frequency band for near field communication (for example, RF (Radio Frequency) band). The transceiver portion demodulates a signal received at the near field communication antenna and provides a resulting demodulated signal to the main processing unit 13. The transceiver portion also modulates input data from the main processing unit 13 and transmits resulting modulated data from the near field communication antenna.

The memory 12 is a rewritable non-volatile storage medium. The memory 12 may be realized by, for example, a flash memory or a ROM. The tag IDs are registered in the memory 12.

The main processing unit 13 controls an operation of the near field communication unit 11. The main processing unit 13 may be realized by, for example, a CPU or an IC. The main processing unit 13 cooperates with the near field communication unit 11 and performs processing to transmit an identification signal (hereinafter, referred to as transmission processing).

The main processing unit 13 has two operation modes. One is a passive transmission mode in which an identification signal is transmitted upon receipt of an inquiry signal transmitted from the notification device 2 as a trigger. The other is an active transmission mode in which an identification signal is transmitted regularly at a predetermined transmission period.

The main processing unit 13 stays in a sleep mode in the passive transmission mode unless an inquiry signal is received. In the sleep mode, power consumption is reduced by keeping a function necessary to detect a reception of an inquiry signal from the notification device 2 in operation while stopping operations of the other functions.

It is preferable that whether the main processing unit 13 operates in the passive transmission mode or the active transmission mode can be selected by the user. In the present embodiment, assume that the main processing unit 13 is set in the passive transmission mode as an example. Alternatively, the main processing unit 13 may be configured to operate only in one of the passive transmission mode and the active transmission mode.

The main processing unit 13 set in the passive transmission mode transmits an identification signal after a random wait time measured from a time of reception of the inquiry signal from the notification device 2 with an aim of reducing a risk that two or more wireless tags 1 reply at same timing in a circumstance where two or more wireless tags 1 are present near the notification device 2. The wait time may be determined by using a pre-registered random number table.

Configuration of Notification Device 2

Figure 3:
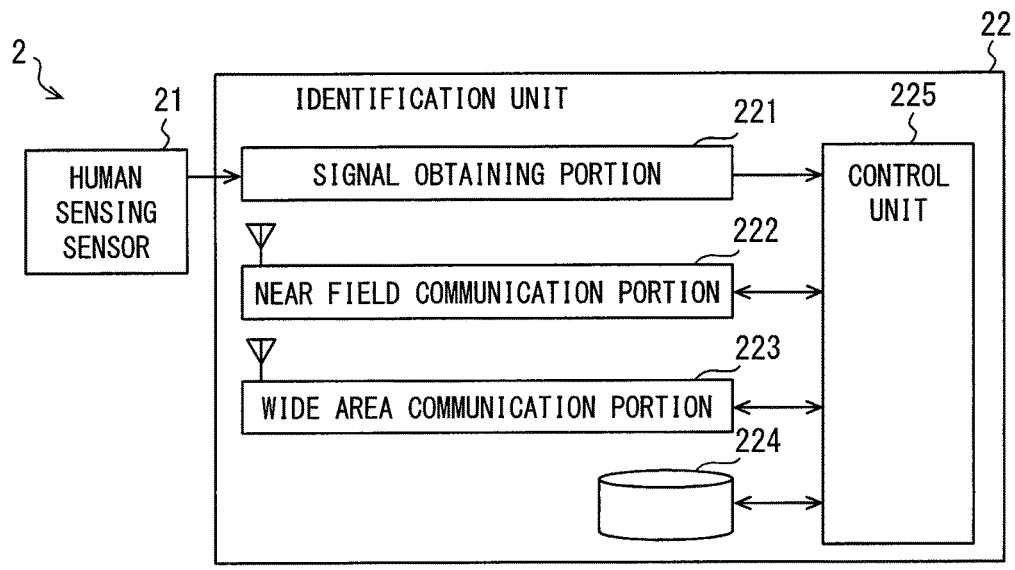
FIG. 3 is a block diagram showing a schematic configuration of a notification device.

A configuration of the notification device 2 will now be described. As is shown in FIG. 3, the notification device 2 includes the human sensing sensor 21 and the identification unit 22. More in detail, the identification unit 22 includes a signal obtaining portion 221, a near field communication portion 222, a wide area communication portion 223, a user setting storage portion 224, and a control unit 225. Each of the signal obtaining portion 221, the near field communication portion 222, the wide area communication portion 223, and the user setting storage portion 224 is connected to the control unit 225 and allowed to communicate in two ways. The notification device 2 corresponds to a facility-side device.

The human sensing sensor 21 is a sensor detecting presence or absence of a substantial being, such as an individual, within a predetermined region to be detected (hereinafter, referred to as a detection area). The human sensing sensor 21 used herein as an example is a known infra-red ray sensor. That is, when a substantial being having a temperature difference from ambient temperature moves within the detection area, the human sensing sensor 21 detects a movement by using an infra-red ray according a temperature change and outputs a signal. An output signal of the human sensing sensor 21 functions as a signal indicating presence of a substantial being, such as an individual, within the detection area. The human sensing sensor 21 used herein as an example is an infra-red ray sensor. However, the human sensing sensor 21 may be realized by a camera or an ultrasonic sensor in modifications or other embodiments.

The human sensing sensor 21 may be provided to a room ceiling, an exterior wall surface, a roof, an erected pillar, or the like to form a desired detection area. It is particularly preferable to provide the human sensing sensor 21 to form a detection area including a spot used often by an intruder as a route of intrusion into the house, such as near a window or a front door. Two or more human sensing sensors 21 may be provided to form a desirable detection area. In other words, the detection area may be realized by using multiple human sensing sensors 21 each covering a relatively small area as a range of detection.

The signal obtaining portion 221 is an interface obtaining a signal from the human sensing sensor 21. The signal obtaining portion 221 may be realized by an analog circuit element or an IC.

The near field communication portion 222 is a communication module making near field communication. A specific configuration or the like is same as the configuration of the near field communication unit 11 in the wireless tag 1. The near field communication portion 222 demodulates a received signal and outputs a resulting demodulated signal to the control unit 225. For example, the near field communication portion 222 receives an identification signal transmitted from the wireless tag 1 and outputs data (to be more specific, the tag ID) representing the identification signal to the control unit 225.

The near field communication portion 222 modulates input data from the control unit 225 and transmits resulting modulated data. For example, the near field communication portion 222 transmits an inquiry signal according to a command from the control unit 225. The near field communication portion 222 corresponds to an identification signal receiving device.

A communication area of the near field communication portion 222 is formed to coincide or substantially coincide with the detection area. The communication area referred herein means a range within which the near field communication portion 222 is capable of making near field communication. The communication area may be adjusted by adjusting various factors, such as transmission power, an amplification factor of a received signal, an installed position of the near field communication antenna, and directivity of the near field communication antenna.

The wide area communication portion 223 is a communication module which communicates with the crime prevention center 3 by establishing a connection to the wide area communication network. The wide area communication network referred to herein means a public communication network provided by a telecommunication company, such as a mobile telephone network and the Internet. Hereinafter, communication via the wide area communication network is referred to as wide area communication.

The wide area communication portion 24 modulates input data from the control unit 225 and transmits resulting modulated data to the crime prevention center 3. The wide area communication portion 24 also receives data transmitted from the crime prevention center 3 and forwards the received data to the control unit 225.

The user setting storage portion 224 is realized by a rewritable non-volatile storage medium. Data can be written into and read out and deleted from the user setting storage portion 224 by the control unit 225. The tag IDs assigned to the wireless tags 1 carried by the users are saved in the user setting storage portion 224. Hence, the users correspond to a registered individual. The tag IDs registered in the user setting storage portion 224 correspond to registered identification information.

The users have own user IDs, which are identification numbers uniquely assigned to the respective users. In the user setting storage portion 224, the tag IDs assigned to the wireless tags 1 carried by the respective users are stored in association with the user IDs identifying the users carrying the respective wireless tags 1. The user setting storage portion 224 corresponds to an identification information storage unit.

The wireless tags 1 are carried as such not only by the users residing in the house installed with the notification device 2, but also by other various individuals. Hereinafter, the wireless tags 1 carried by the users residing in the house installed with the notification device 2 are referred to also as resident tags when distinguished from the wireless tags 1 carried by other individuals. Also, the tag IDs associated with the respective users are referred to as resident tag IDs.

The control unit 225 is formed of a typical computer and includes a CPU, a RAM, a ROM, an I-O, and a bus line interconnecting the foregoing components. The CPU is an electronic circuit module performing various types of arithmetic processing and realized by a microprocessor or the like. The RAM is a volatile memory while the ROM is a non-volatile memory.

A program causing a typical computer to function as the control unit 225 (hereinafter, referred to as a notification program) and the like are stored in the ROM. The notification program only has to be stored in a non-transitory tangible storage medium and may be stored in a storage medium other than the ROM in practice. Running the notification program on the CPU corresponds to performing a method according to the notification program. The I-O functions as an interface to input and output data between the control unit 225 and various devices, for example, the near field communication portion 222. The I-O may be realized by an analog circuit element or an IC.

The control unit 225 performs notification related processing by running the notification program stored in the ROM on the CPU. The notification related processing corresponds to processing to determine whether an individual other than the users (suspicious individual) is present within the detection area and to transmit a message informing presence of the suspicious individual within the detection area (hereinafter, referred to as a suspicious individual detection message) to the crime prevention center 3 when the presence of the suspicious individual within the detection area is determined. In short, the notification related processing is processing to notify the crime prevention center 3 of intrusion of a suspicious individual. The notification related processing will be described more in detail below.

Configuration of Crime Prevention Center 3

Figure 4:
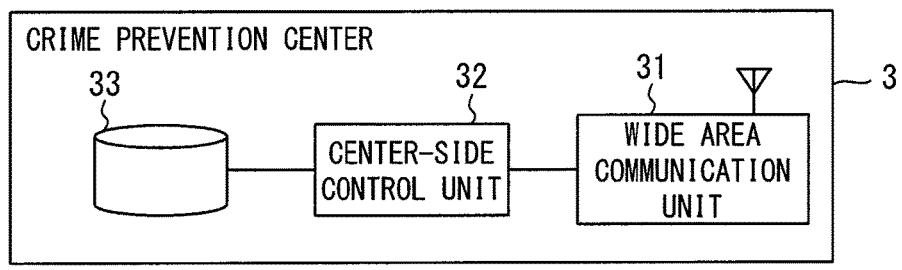
FIG. 4 is a block diagram showing a schematic configuration of a crime prevention center.

The crime prevention center 3 will now be described. The crime prevention center 3 is realized by one or more than one server device. As is shown in FIG. 4, the crime prevention center 3 includes a wide area communication unit 31, an installed facility DB (database) 32, and a center-side control unit 33. The center-side control unit 33 is connected to each of the wide area communication unit 31 and the installed facility DB 32 and allowed to communicate in two ways.

The wide area communication unit 31 is a communication module making wide area communication with the notification device 2. The wide area communication unit 31 outputs received data (for example, a suspicious individual detection message) to the center-side control unit 33. The wide area communication unit 31 also modulates input data from the center-side control unit 33 and transmits resulting modulated data to an outside device (for example, the wide area communication terminal 4).

The installed facility DB 32 is realized by a rewritable non-volatile storage medium. Addresses of facilities installed with the notification devices 2, management numbers unique to the respective notification devices 2, the user IDs and telephone numbers and mail addresses as emergency points of contact registered in the respective notification devices 2, and so on are associated with one another and saved in the installed facility DB 32 as information on facilities installed (provided) with the notification devices 2.

The center-side control unit 33 is responsible for a control of an overall operation of the crime prevention center 3. The center-side control unit 33 is formed of a typical computer including a CPU, a RAM, a ROM, an I-O, and a bus line interconnecting the foregoing components.

The center-side control unit 33 performs predetermined countermeasure processing upon receipt of a suspicious individual detection message transmitted from the notification device 2 with aims of preventing an intrusion attempt by the suspicious individual, confirming identity of the suspicious individual, and contacting the users. For example, the center-side control unit 33 refers to the installed facility DB 32 and calls or transmits a message informing a detection of intrusion of a suspicious individual to the phone number registered as the emergency point of contact of the message-sender notification device 2. The center-side control unit 33 may also direct a security guard to head for the facility installed with the message-sender notification device 2 or call a police station.

Wide Area Communication Terminal 4

The wide area communication terminal 4 is a communication terminal furnished with a function of connecting to the wide area communication network and represented by a smartphone, a tablet terminal, a personal computer, and the like. The wide area communication terminal 4 includes an input device accepting an operation of the user, and an information output device providing the user with information. The input device is, for example, a touch panel, a keyboard, a mouse, a speech recognition device, and so on. The information output device is a device outputting information in a human-perceivable manner, such as a display and a speaker.

Upon receipt of a message transmitted from the crime prevention center 3, the wide area communication terminal 4 notifies the user of a detection of intrusion of a suspicious individual into the house by outputting an image showing or a voice reading a content of the received message.

Notification Related Processing

Figure 5:
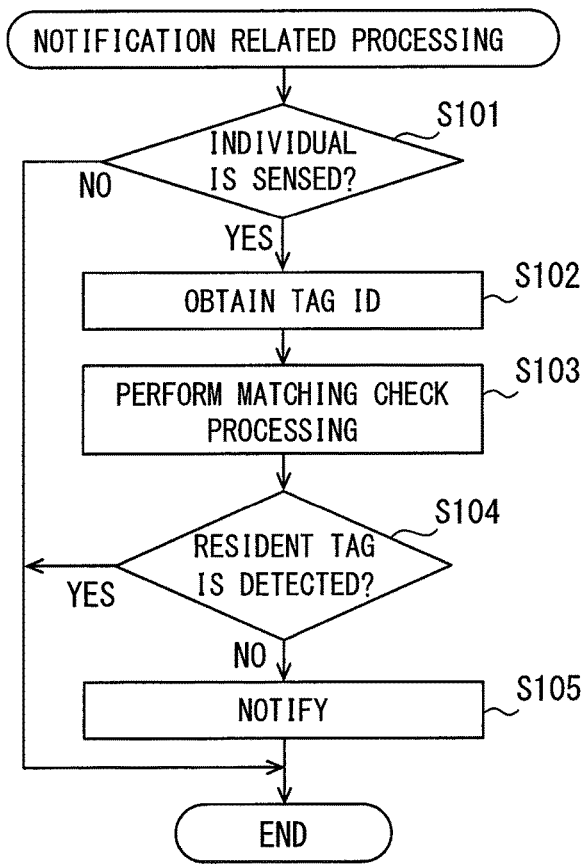
FIG. 5 is a flowchart of notification related processing performed by a control unit.

The notification related processing performed by the control unit 225 will now be described by using a flowchart of FIG. 5. The flowchart of FIG. 5 may be started successively (for example, every 100 milliseconds).

Firstly, whether an individual is present in the detection area is determined according to an output signal of the human sensing sensor 21 in Step S101. Determining whether an individual is present in the detection area corresponds to determining whether an event that an individual enters the detection area occurs. Hence, the control unit 225 performing Step S101 corresponds to an event detection unit.

In a case where a signal indicating the presence of an individual in the detection area is not inputted from the human sensing sensor 21, a negative determination is made in Step S101 and the flow is ended. Meanwhile, in a case where a signal indicating the presence of an individual in the detection area is inputted from the human sensing sensor 21, a positive determination is made in Step S101 and advancement is made to Step S102. Hereinafter, an individual detected by the human sensing sensor 21 is referred to as an entered person for ease of description.

In Step S102, an inquiry signal is transmitted in cooperation with the near field communication portion 222. In a case where an identification signal is returned, the tag ID exhibited by the identification signal is saved in the RAM or the like each time an identification signal is returned. Advancement is made to Step S103 when a predetermined wait time elapses after the inquiry signal is transmitted. In a case where the entered person is one of the users, the control unit 225 obtains the tag ID assigned to one of the resident tags by performing Step S102.

In Step S103, the tag IDs registered in the user setting storage portion 224 (the resident tag IDs) and the tag IDs obtained in Step S102 are checked against each other one by one in all combinations. When a matching check result in Step S103 reveals that none of the tag IDs obtained in Step S102 matches any one of the resident tag IDs, a negative determination is made in Step S104 and advancement is made to Step S105.

A case where none of the tag IDs matches any one of the resident tag IDs corresponds to a case where no resident tag is detected.

Meanwhile, in a case where a tag ID matching any one of the resident tag IDs is received (the resident tag is detected), a positive determination is made in Step S104 and the flow is ended. The flow proceeds in the manner as above because when a tag ID matching any one of the resident tag IDs is received, it means that the entered person is one of the users. The control unit 225 performing Step S103 corresponds to an individual identification unit.

In Step S105, a suspicious individual detection message is transmitted to the crime prevention center 3 in cooperation with the wide area communication portion 223. Then, the flow is ended. The flow proceeds in the manner as above because when a tag ID matching any one of the resident tag IDs is not received, it means that the entered person is not any one of the users, that is, the entered person is a suspicious individual.

Upon receipt of the suspicious individual detection message, the crime prevention center 3 attempts to protect the messenger-sender facility by performing the countermeasure processing described above. That is, transmission of a suspicious individual detection message (notification) corresponds to crime prevention processing and the control unit 225 performing Step S105 corresponds to a crime prevention processing unit.

Summary of First Embodiment

According to the present embodiment, the notification device 2 determines whether any resident tag is present within a predetermined detection area upon detection of an individual entering the detection area. In a case where the entered person is one of the users, the corresponding resident tag is detected. Meanwhile, no resident tag is detected in a case where the entered person is not any one of the users. Accordingly, whether the entered person is one of the pre-registered users or a suspicious individual can be identified depending on whether any resident tags is detected.

The crime prevention center 3 is notified only in a case where no resident tag is detected, that is, the entered person is an individual other than the users. Hence, according to the configuration as above, a frequency of unnecessary notification can be reduced.

While the above has described one embodiment by way of example, it should be appreciated that a technical idea of the present disclosure is feasible as various modifications including modifications described below. It should be also appreciated that the first embodiment and various modifications can be combined as needed.

Members furnished with same functions furnished to the members described in the embodiment above are labelled with same reference numerals and a description is not repeated. In a case where only a part of the configuration is described, the configuration described in the embodiment above is applicable to a rest of the configuration.

First Modification

The above has described the configuration in which notification is not performed when any one of the resident tags is detected within the detection area as an example. However, the present disclosure is not limited to the configuration as above. For example, in a case where a location of the detected resident tag is remote from a location of the entered person, a likelihood of intrusion of a suspicious individual into the detection area is high. That is, it may be configured in such a manner that a location of the resident tag and a location of the entered person are identified and the crime prevention center 3 or the like is notified when the two locations are remote. The configuration as above is a first modification. The first modification may be realized as follows.

In a case where any one of the resident tags is detected in Step S104, the control unit 225 further identifies a location of the detected resident tag and a location of the entered person. In a case where a distance between the location of the entered person and the location of the resident tag ID is shorter than a predetermined distance (for example, 10 m), the entered person is determined as being one of the users and notification is not performed. Meanwhile, in a case where a distance between the location of the entered person and the location of the resident tag ID is as long as or longer than the predetermined distance, the entered person is determined as being a suspicious individual and notification is performed.

A location of the resident tag within the detection area may be identified by adopting a configuration as follows. That is, three or more near field communication portions 222 are disposed at different positions for a communication area of each to fully cover (more preferably, to coincide with) the detection area. Upon receipt of an identification signal from the resident tag, the control unit 225 estimates distances from the respective near field communication portions 222 to the wireless tag 1 according to received signal intensity of the identification signal.

In general, received signal intensity is correlated with a distance between communication terminals. Hence, a distance between the near field communication portion 222 and the resident tag can be identified according to received signal intensity of the identification signal from the resident tag. For example, received signal intensity may be converted to a distance by using a table, a map, or a function prepared by a test or the like and indicating a correspondence relationship between received signal intensity and a distance between terminals.

The control unit 225 estimates a location of the resident tag within the detection area according to distances from the respective near field communication portions 222 to the resident tag and the installed positions of the respective near field communication units 222. A method of identifying a location according to distances from three reference points (herein, installed positions of the respective near field communication portions 222) is known as a measuring technique and a detailed calculation method is not described herein. The installed positions of the respective near field communication portions 222 may be registered in the ROM.

Meanwhile, a location of the entered person may be identified by, for example, disposing multiple human sensing sensors 21 for each to cover a different range of detection. The location of one of the human sensing sensors 21 which detects an individual corresponds to a location of the entered person among a plurality of human sensing sensors 21. However, it goes without saying that a method of identifying a location of the entered person is not limited to the method as above. For example, in a case where the human sensing sensor 21 is realized by analyzing an image captured by a camera, a location of the entered person within the detection area may be identified from a location of the entered person in the image.

According to the configuration as above, intrusion of a suspicious individual into the detection area can be notified even when the user is present within the detection area.

Second Modification

The above has described the configuration in which the notification device 2 notifies to the crime prevention center 3. However, the present disclosure is not limited to the configuration as above. For example, the notification device 2 may notify to the wide area communication terminal 4 carried by the user. It goes without saying that the notification device 2 may notify to a police station or the like.

Third Modification

The control unit 225 may sound an alarm or the like from a speaker provided in the detection area or turn on or blink a light upon detection of an individual other than the users (a suspicious individual) entering the detection area. In short, the control unit 225 may perform processing to frighten away the suspicious individual by light or a sound. Such processing also corresponds to an example of the crime prevention processing.

Fourth Modification

The above has described the configuration under the precondition that the wireless tag 1 operates in the passive transmission mode. Hence, an inquiry signal is transmitted in Step S102. However, the present disclosure is not limited to the configuration as above. For example, in a case where the wireless tag 1 operates in the active transmission mode as a precondition, the control unit 225 receives the tag ID assigned to the wireless tag 1 present within the detection area whenever necessary. When configured in such a manner, the control unit 225 temporarily saves the tag ID exhibited by the identification signal received within a past predetermined time in the unillustrated RAM or the like.

When a signal indicating detection of the presence of the entered person is inputted from the human sensing sensor 21, the control unit 225 determines whether any one of the resident tag IDs is included in the tag IDs obtained during a time zone determined with reference to a detection time when the entered person is detected. In a case where no resident tag ID is included, notification is performed. In a case where any one of the resident tag IDs is included (any one of the resident tags is detected), notification is not performed. Effects same as the effects of the first embodiment above can be obtained also by the configuration as above.

A time zone determined with reference to the detection time may be a past predetermined time elapsed before the detection time, a predetermined time elapsed after the detection time, or a predetermined time elapsed before and after the detection time. In any case, the time zone determined with reference to the detection time is set to include the detection time itself. The time zone corresponds to a detection time zone.

Fifth Modification

The above has described the crime prevention system 100 chiefly aimed at making a notification of a suspicious individual. However, the present disclosure is not limited to the configuration as above. For example, the crime prevention system 100 may be used to transmit a notice informing that a particular user among multiple users returns home to the wide area communication terminals 4 carried by the other users. Which user returns home may be identified by the tag ID assigned to the resident tag obtained in Step S102.

A user set to be notified to the other users when the user returns home will be referred to as a protection target person for ease of description. The users set to receive a notice informing that the protection target person returns home (home return notice) will be referred to as protectors. The wireless tag 1 carried by the user set as the protection target person will be referred to as a protection target person tag.

The protection target person may be set by the users as needed. In a case where a family of four, parents and two children, resides in a house installed with the notification device 2, each of the two children may be registered as the protection target person and the users corresponding to the parents are registered as the protectors in the user setting storage portion 224. Herein, assume that information on telephone numbers and mail addresses of the wide area communication terminals 4 carried by the users set as the protectors is saved in the user setting storage portion 224 as points of contact when the home return notice is transmitted and in association with the user IDs or the like.

Figure 6:
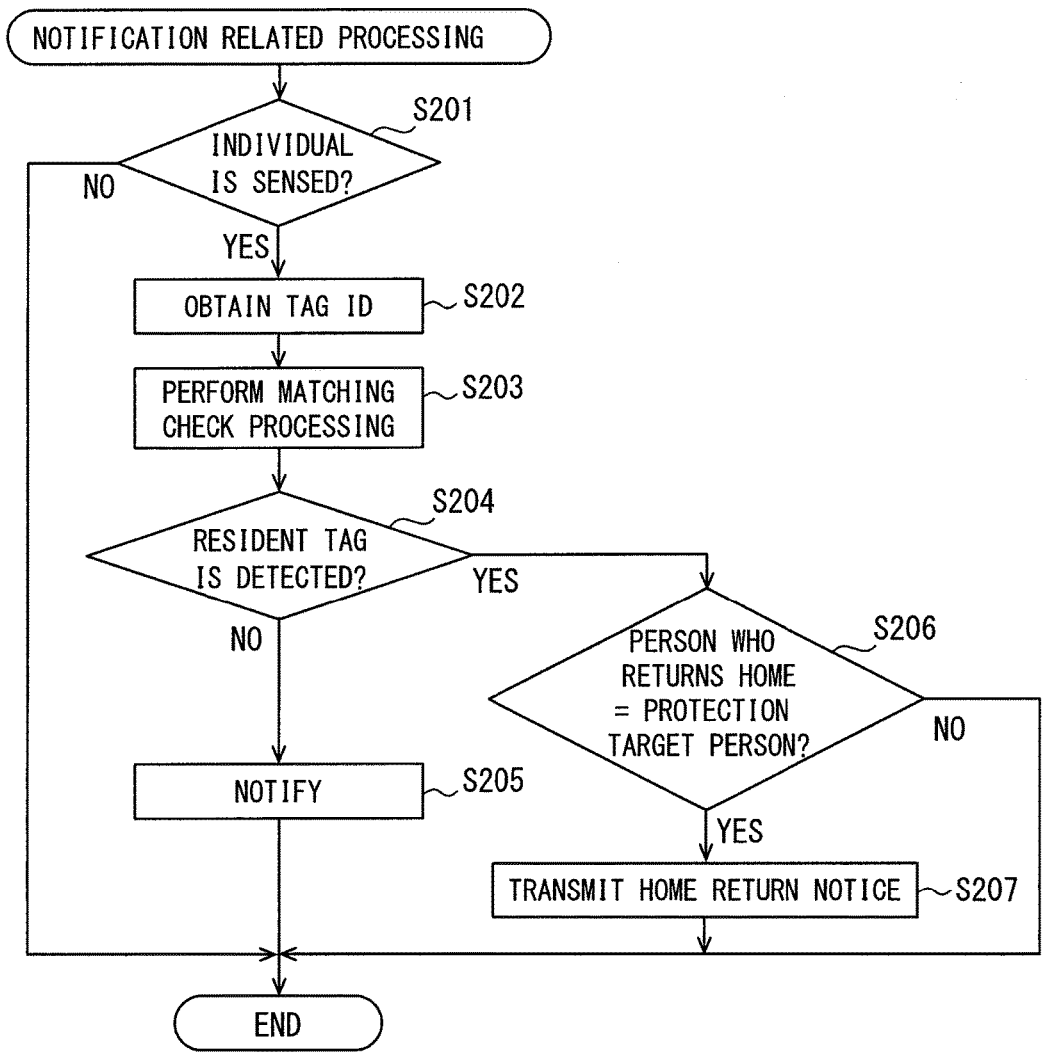
FIG. 6 is a flowchart of notification related processing performed by the control unit in a fifth modification.

Notification related processing performed by the control unit 225 in the fifth modification may be performed in accordance with steps of, for example, FIG. 6. Step S201 through Step S203 of FIG. 6 are same, respectively, as Step S101 through Step S103 in the notification related processing of FIG. 5 described above. The control unit 225 performing Step S201 corresponds to the event detection unit.

In case a where a matching check result in Step S203 reveals that none of the tag IDs obtained in Step S202 matches any one of the resident tag IDs, a negative determination is made in Step S204 and advancement is made to Step S205. Meanwhile, in a case where a tag ID matching any one of the resident tag IDs is received, a positive determination is made in Step S204 and advancement is made to Step S206. The control unit 225 performing Step S203 corresponds the individual identification unit.

In Step S205, a suspicious individual detection message is transmitted to the crime prevention center 3 in cooperation with the wide area communication portion 223. Then, the flow is ended. The control unit 225 performing Step S205 corresponds to the crime prevention processing unit.

In Step S206, a determination is made as to whether the user (user who returns home) with the tag ID assigned to the resident tag detected in Step S203 is either one of the two users registered as the protection target persons according to the tag ID assigned to the resident tag detected in Step S203. In a case where the user who returns home is either one of the two protection target persons, a positive determination is made in Step S206 and advancement is made to Step S207. Meanwhile, in a case where the user who returns home is neither one of the two protection target persons, a negative determination is made in Step S206 and the flow is ended. The control unit 225 performing Step S206 corresponds to a returned person determination unit.

In Step S207, a home return notice is transmitted to the wide area communication terminals 4 carried by the users set as the protectors in cooperation with the wide area communication portion 223. The home return notice includes information specifying who returns home, that is, information specifying the user identified by the tag ID detected in Step S203. Upon receipt of the home return notice, the wide area communication terminals 4 display or read a message informing that the user specified in the home return notice returns home. The control unit 225 performing Step S207 corresponds to a home return notice processing unit.

According to the configuration as above, the users set as the protectors can confirm that the protection target persons return home even when the users set as the protectors doing work or shopping are not in home.

Whether the user returns home or goes out may be identified by, for example, a method as follows. In a case where the resident tag is detected while the house door is locked, when the door is unlocked a certain time (for example, several minutes) later, it is determined that the user returns home. Whether the door is locked or unlocked may be detected by a sensor detecting a locking state of the door (hereinafter, referred to as a locking sensor).

It is preferable that the detection area used to determine whether the user returns home is formed to cover a region where the user passes through when the user returns home. For example, it is preferable to form the detection area to cover a local outside area within a certain distance from the door. An outside area within a certain distance from the door will be referred to as an outside door area for ease of description.

In a case where the door is locked while presence of the resident tag in the outside door area is identified, it may be determined that the user carrying the detected resident tag goes out.

It goes without saying that a method of determining whether a behavior of the user is a behavior when the user returns home or goes out is not limited to the method described above. For example, in a case where the detection area includes two areas: an inside detection area covering only an area inside the house as a target range of detection and an outside detection area covering only an area outside the house as a target range of detection, as a detection area, whether a behavior of the user is a behavior when the user returns home or goes out can be identified also by a changing pattern of a detection area within which an identification signal from the wireless tag 1 carried by the user is detectable.

For example, the detection area within which the wireless tag 1 carried by the user is detectable changes from the inside detection area to the outside detection area, it can be determined that the user carrying the wireless tag 1 goes out. Conversely, in a case where the detection area within which the wireless tag 1 carried by the user is detectable changes from the outside detection area to the inside detection area, it can be determined that the user carrying the wireless tag 1 returns home.

The above has described the configuration in which the protectors are notified that the protection target persons return home. However, the present disclosure is not limited to the configuration as above. In a case where any one of the protection target persons who goes out is detected, a notice may be transmitted to the wide area communication terminals 4 of the protectors to inform that either one of or both the protection target persons go out. A method of detecting the user who goes out has been described above.

The fifth modification has described a configuration in which notification is performed in a case where a matching check result in Step S203 reveals that no resident tag IDs is detected as an example. However, the present disclosure is not limited to the configuration as above. For example, in a case where no resident tag ID is detected, the flow may be ended directly. That is, when no resident tag ID is detected, the crime prevention processing, such as notification, is performed optionally.

Sixth Modification

The first embodiment above has described the configuration in which notification to an outside, such as the crime prevention center 3 and the wide area communication terminals 4, is not performed in a case where any one of the resident tags is present within a range of detection as an example. However, the present disclosure is not limited to the configuration as above. It may be configured in such a manner that the control unit 225 performs notification in a case where a tag ID assigned to the wireless tag 1 and separately registered as an essential tag is not detected even when the resident tag is detected. The essential tag means a tag ID used in the notification related processing and presence of the essential tag together with the corresponding resident tag is an essential condition when it is determined not to notify to the outside.

Figure 7:
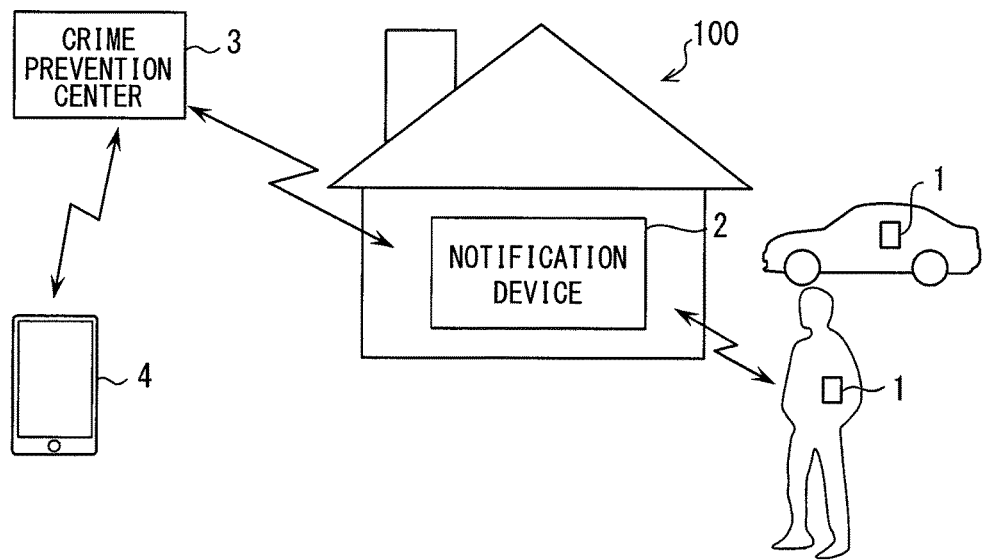
FIG. 7 is a block diagram showing a schematic configuration of the crime prevention system in a sixth modification.

By using FIG. 8, the following will describe notification related processing in a case where the wireless tag 1 is also attached to a vehicle owned by the users (hereinafter, referred to as an owned vehicle) as is shown in FIG. 7 and the tag ID assigned to the wireless tag 1 provided to the owned vehicle (hereinafter, referred to as a vehicle tag) is registered in the user setting storage portion 224 as the tag ID assigned to the essential tag. The tag ID assigned to the vehicle tag corresponds to mobile object identification information.

Figure 8:
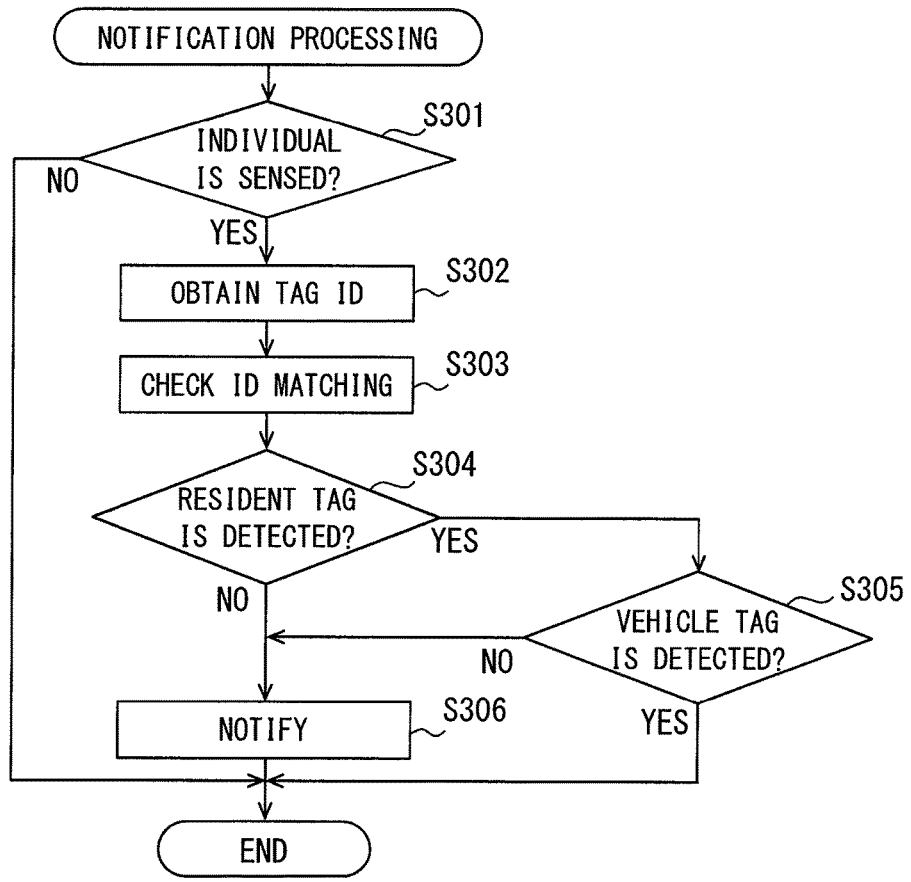
FIG. 8 is a flowchart of notification related processing performed by the control unit in the sixth modification.

Step S301 through Step 303 in the notification related processing depicted in FIG. 8 are same, respectively, as Step S101 through Step S103 described above. The control unit 225 performing Step S301 corresponds to the event detection unit.

In a case where a matching check result in Step S303 reveals that none of the tag IDs obtained in Step S302 matches any one of resident tag IDs, a negative determination is made in Step S304 and advancement is made to Step S306. Meanwhile, in a case where a tag ID matching any one of the resident tag IDs is received, a positive determination is made in Step S304 and advancement is made to Step S305. The control unit 225 performing Step S303 corresponds to the individual identification unit.

In Step S305, a positive determination is made in a case where a matching check result in Step S303 reveals that the tag ID assigned to the essential tag (herein, the vehicle tag) is detected. Then, the flow is ended. In a case where a tag ID matching the tag ID assigned to the vehicle tag is not detected, a negative determination is made in Step S305 and advancement is made to Step S306.

In Step S306, a suspicious individual detection message is transmitted to the crime prevention center 3 in cooperation with the wide area communication portion 223. Then, the flow is ended. The control unit 225 performing Step S306 corresponds to the crime prevention processing unit.

According to the configuration as above, notification is performed in a case where the vehicle tag is absent even when the resident tag ID is present. According to the configuration as above, notification can be performed in a case where a third party who fraudulently obtains the tag ID assigned to any one of the resident tags enters the house while all the residents go out for a trip by the owned vehicle. Tag IDs that can be registered as the essential tags are not particularly limited. For example, a tag ID assigned to the wireless tag 1 provided to a mobile object, such as a bicycle, may be registered as the essential tag.

One or more than one of multiple users may be set as a user excused from a determination using the essential tag. Alternatively, tag IDs which differ from one user to another may be registered as the essential tags. For example, the essential tag of one user may be the tag ID of a bicycle while the essential tag of another user may be a tag ID of the owned vehicle.

Seventh Modification

The embodiment and the modifications above have described the configuration in which presence or absence of the tag ID assigned to the resident tag is used to determine whether notification is to be performed. However, the present disclosure is not limited to the configuration as above. The presence or absence of the resident tag ID may be used as a condition when the door is unlocked with permission. It is a precondition in a seventh modification that the control unit 225 is also furnished with a locking state control function of controlling a locking state of the door.

More specifically, the control unit 225 in the seventh modification performs a control to maintain a locking state when no resident tag ID is detected. For example, in a case where a locking mechanism locks and unlocks the door with a key inserted into a key hole, insertion of the key into the key hole is prevented by a physical element, such as a metal plate, when no resident ID tag is present. By introducing such a mechanism, a risk that the door is unlocked by picking or the like can be lowered.

In a case where the locking mechanism locks the door with a card key, the card key may be read only when any one of the resident tag IDs is present. The same applies to other authentication methods, such as fingerprint authentication. It goes without saying that the seventh modification may be combined with the sixth modification above to keep the door locked unless both the resident tag ID and the essential tag are present. Processing performed by the control unit 225 of the seventh modification also corresponds to an example of the crime prevention processing.

Second Embodiment

A visitor identification system 100A as a second embodiment will now be described. The visitor identification system 100A of the present embodiment is a system applied to a predetermined facility, for example, an individual house or an office to identify whether an individual visiting the facility is an individual pre-registered as an expected visitor and notifies a user, such as a resident, of an identification result.

The following will describe a case where the visitor identification system 100A is used as a system identifying whether a delivery person visiting an individual house is a pre-registered authenticated delivery person as an example.

Members furnished with same functions furnished to the members described in the first embodiment and the modifications above are labelled with same reference numerals and a description is not repeated. In a case where only a part of configurations is described, the configurations described in the embodiment and the modifications above are applicable to a rest of the configurations.

Figure 9:
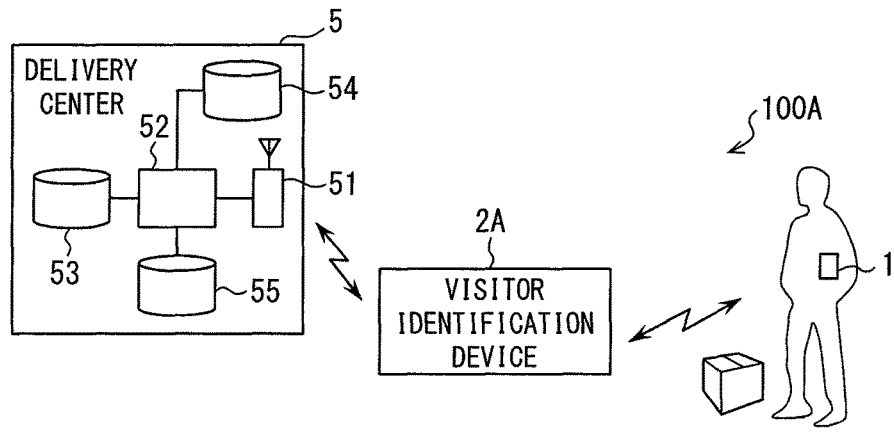
FIG. 9 is a block diagram showing a schematic configuration of a visitor identification system according to a second embodiment.
Figure 10:
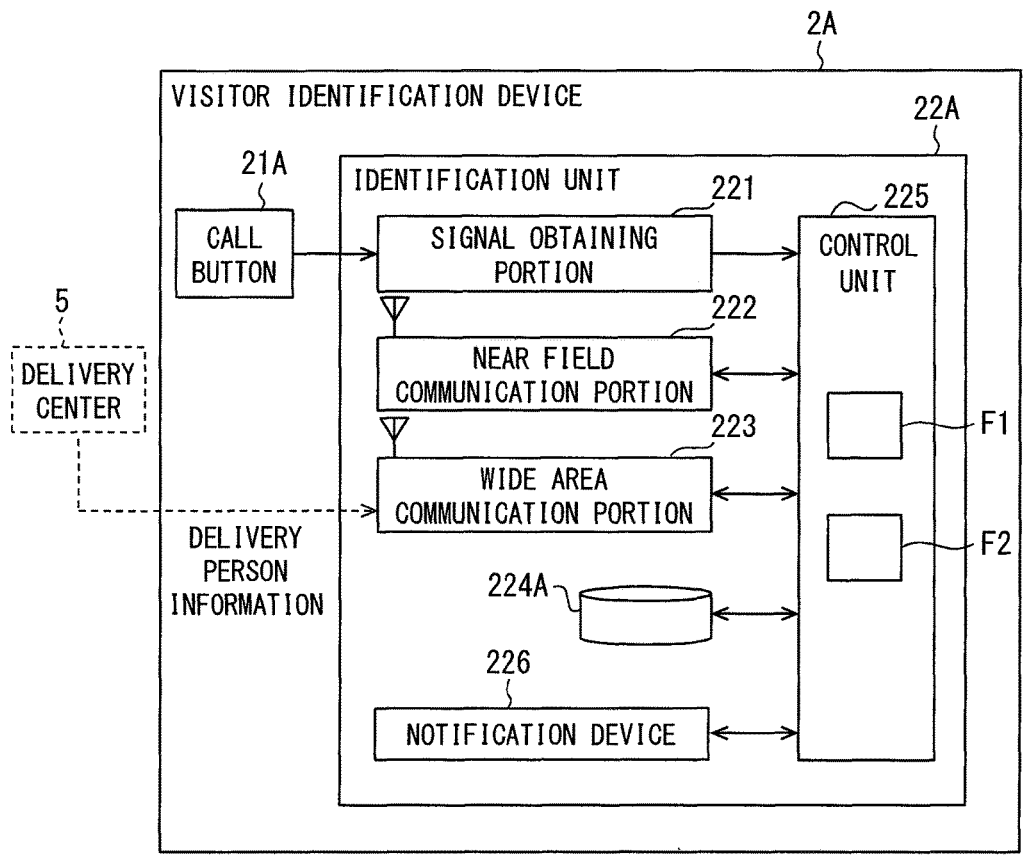
FIG. 10 is a block diagram showing a schematic configuration of a visitor identification device.

As is shown in FIG. 9, the visitor identification system 100A includes a wireless tag 1 carried by a delivery person, a visitor identification device 2A installed to the individual house, and a delivery center 5 managing a delivery status of a package. As is shown in FIG. 10, the visitor identification device 2A includes a call button 21A and an identification unit 22A. The delivery center 5 includes a wide area communication unit 51, a center-side control unit 52, a delivery person DB (database) 53, a delivery status DB (database) 54, and a customer DB (database) 55. The visitor identification device 2A corresponds to the facility-side device.

The delivery person DB 53, the delivery status DB 54, and the customer DB 55 are realized by rewritable non-volatile recording media. Data can be written into and read out and deleted from the delivery person DB 53, the delivery status DB 54, and the customer DB 55 by the center-side control unit 52.

Tag IDs assigned to wireless tags 1 carried by respective delivery persons belonging to a delivery company which provides the delivery center 5 are stored in the delivery person DB 53 in association with attribute information of the delivery persons carrying the wireless tags 1. The attribute information includes a delivery person number, a face image, a height, age, a gender of a delivery person, and so on. The delivery person number is a unique number assigned to each delivery person as information used to identify the delivery person.

Data indicating a delivery status of a package is stored in the delivery status DB 54. Information on delivery statuses or the like of various packages is managed by slip numbers of the respective packages. Slip numbers are stored in the delivery status DB 54 in association with information specifying contents (types) of packages, desired delivery time zones, estimated times of delivery, delivery person numbers assigned to delivery persons delivering the packages (hereinafter, referred to as delivery persons in charge), and so on. A desired delivery time zone is information on a time zone appointed by a sender and specifies when a package is to be delivered.

The customer DB 55 is a database in which communication information (for example, IP addresses and mail addresses) used to broadcast various types of information (for example, delivery person information described below) to the visitor identification device 2A via a wide area communication network is stored. Communication information of the visitor identification device 2A provided to each facility is stored in the customer DB 55 in association with an address of the facility and the like.

The center-side control unit 52 makes plans for a day as to which delivery person delivers which packages in which route and registers the plans into the delivery status DB 54. Accordingly, goods (packages) delivered and houses visited by a single delivery person in one day as well as time zones of visits are determined. The center-side control unit 52 also updates delivery statuses of packages according to the slip numbers of the packages registered in the delivery status DB 54 by using the slip number, or the like provided to the package.

Also, at predetermined timing, the center-side control unit 52 transmits information on a delivery person in charge (hereinafter, referred to as delivery person information) to the visitor identification device 2A provided to a house a delivery person is to visit. The delivery person information only has to include a tag ID assigned to the wireless tag 1 carried by the delivery person in charge. As a more preferred example, the delivery person information used herein includes a delivery company name, a face image and a gender of the delivery person in charge, and a content of the package in addition to the tag ID. The delivery person information may further include an age group, an approximate height, and so on.

The center-side control unit 52 is capable of identifying a house a delivery person is to visit by accessing the delivery status DB 54, and capable of acquiring the communication information of the visitor identification device 2A installed to the identified house by accessing the customer DB 55.

The delivery person information only has to be broadcasted before the delivery person in charge actually visits a house of a package receiver. Broadcast timing of the delivery person information may be determined as needed within a range of restriction as above. For example, the delivery person information may be broadcasted to the respective visitor identification devices 2A when a delivery service of the day begins.

The call button 21A provided to the visitor identification device 2A is a button a visitor uses to let a person inside who is an individual present inside the house know that the visitor arrives at the facility provided with the call button 21A (to call for the person inside). When depressed by the visitor, the call button 21A outputs a signal informing a depression action (hereinafter, a depression signal) to the identification unit 22A. The call button 21A is provided outside at a position designed as needed (for example, near a front door).

In the second embodiment, as is shown in FIG. 10, the identification unit 22A includes a signal obtaining portion 221, a near field communication portion 222, a wide area communication portion 223, an expected visitor storage portion 224A, a control unit 225, and a notification device 226. More in detail, the control unit 225 includes a registration processing portion F1 and a deletion processing portion F2.

A communication area of the near field communication portion 222 is formed to cover a range within which an individual depressing the call button 21A is supposed to be present. In a case where the call button 21A is provided near the front door, the communication area of the near field communication portion 222 is formed to cover a range within a constant distance (for example, 5 m) from the front door.

The expected visitor storage portion 224A is realized by a rewritable non-volatile storage medium. The registration processing portion F1 cooperates with the wide area communication portion 223 and registers the delivery person information broadcasted from the delivery center 5 into the expected visitor storage portion 224A. Accordingly, the tag ID identifying an expected visitor (delivery person) is registered in the expected visitor storage portion 224A. The expected visitor storage portion 224A corresponds to the identification information storage unit. The tag ID identifying the delivery person registered in the expected visitor storage portion 224A will be referred to as a delivery person ID for ease of description. The deletion processing portion F2 will be described below.

The notification device 226 is a device notifying a user of the visitor identification device 2A of predetermined information according to a command from the control unit 225. For example, a speaker or a display may be adopted as the notification device 226. Herein, the identification unit 22A includes both of a speaker and a display as the notification device 226 as an example.

The control unit 225 is formed of a typical computer and includes a CPU, a RAM, a ROM, an I-O, and a bus line interconnecting the foregoing components. A program causing a typical computer to function as the control unit 225 of the second embodiment (hereinafter, referred to as a visitor identification program) and the like are stored in the ROM. The visitor identification program only has to be stored in a non-transitory tangible storage medium and may be stored in a recording medium other than the ROM in practice. Running the visitor identification program on the CPU corresponds to performing a method according to the visitor identification program.

The control unit 225 performs visitor identification related processing by running the visitor identification program stored in the ROM on the CPU. The visitor identification related processing is processing to determine whether a visitor is an authenticated delivery person and to notify the user of a determination result.

Figure 11:
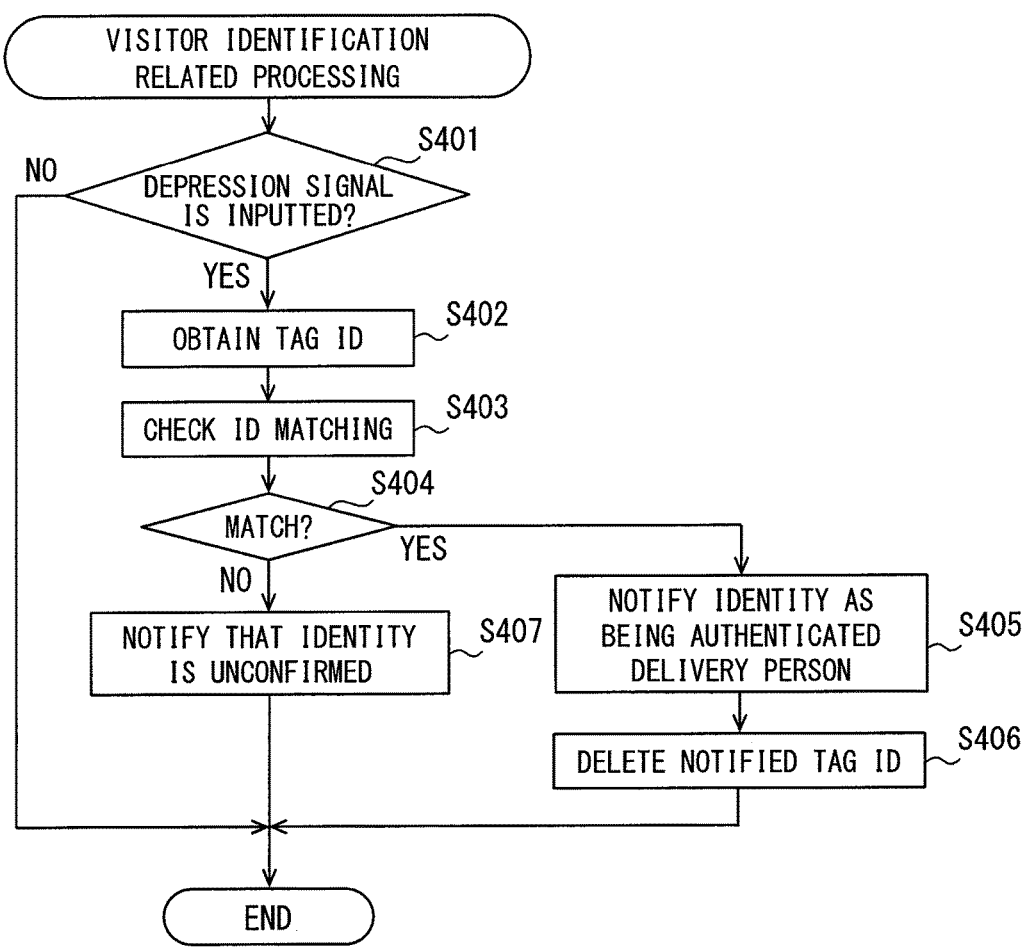
FIG. 11 is a flowchart of visitor identification related processing.

FIG. 11 shows a flowchart depicting steps of the visitor identification related processing. The flowchart of FIG. 11 may be started successively (for example, every 100 milliseconds). Herein, assume that the delivery person information of one delivery person is registered in the expected visitor storage portion 224A for ease of description.

Firstly, whether a visitor arrives at the house is determined according to a signal inputted from the call button 21A in Step S401. More specifically, it is determined that the visitor arrives at the house in a case where a depression signal is inputted from the call button 21A and advancement is made to Step S402. Meanwhile, in a case where a depression signal is not inputted from the call button 21A, it is determined that the visitor has not arrived at the house, and the flow is ended. The control unit 225 performing Step S401 corresponds to the event detection unit.

In Step S402, an inquiry signal is transmitted in cooperation with the near field communication portion 222. In a case where an identification signal is returned, the tag ID exhibited by the identification signal is saved in the RAM or the like each time an identification signal is returned. In a case where a predetermined wait time elapses after the inquiry signal is transmitted, advancement is made to Step S403.

In Step S403, the delivery person ID registered in the expected visitor storage portion 224A is checked against all tag IDs obtained in Step S402 one by one. When a matching check result in Step S403 reveals that a tag ID matching the delivery person ID is received, a positive determination is made in Step S404 and advancement is made to Step S405. Meanwhile, in a case where none of the tag IDs obtained in Step S402 matches the delivery person ID, a negative determination is made in Step S404 and advancement is made to Step S407. In a case where no tag ID is obtained in Step S402, advancement may be made directly to Step S407.

A case where none of the tag IDs matches the delivery person ID corresponds to a case where identify of the visitor is unconfirmed. The control unit 225 performing Step S403 corresponds to the individual identification unit.

In Step S405, information informing that the visitor is an authenticated delivery person notified by the delivery center 5 is outputted from the notification device 226 and advancement is made to Step S406. An output of information is preferably a voice output from the speaker. When configured in such a manner, the user can know whether the visitor is an authenticated delivery person without having to look to the display.

In the present embodiment, the user is notified not only of an identify of the visitor as an authenticated delivery person, but also of a content of the package. When configured in such a manner, the user can know what type of a good the delivery person is delivering before the user starts to deal with the visitor. A gender of the delivery person in charge may also be notified in addition to the identity of the visitor as an authenticated delivery person. It is preferable that the user can designate particulars to be notified. A content of a package, a delivery company name, a gender, an age group, a height, and so on correspond to supplementary information.

In Step S406, the deletion processing portion F2 deletes the delivery person information, such as the tag ID identifying the delivery person notified in Step S405 (who has visited the house), from the expected visitor storage portion 224A. Then, the flow is ended. The control unit 225 performing Steps S405 and S406 corresponds to the notification processing unit.

In Step S407, information informing that the visitor is not the individual registered in the expected visitor storage portion 224A is outputted from the notification device 226. Then, the flow is ended. Notifying the user that the visitor is not the individual registered in the expected visitor storage portion 224A will be referred to as a non-registered visitor arrival report for ease of description.

According to the configuration as above, the user can handle the visitor with knowledge of whether the visitor is the pre-registered delivery person. In a case where a non-registered visitor arrival report is made even when the visitor wears a uniform of the delivery company providing a broadcast service of the delivery person information or identifies himself or herself as an employee of the delivery company, the visitor is likely an imposter posing as a delivery person. That is, a non-registered visitor arrival report functions as reference information when the user determines whether the visitor is an imposter posing as a delivery person. In a case where a non-registered visitor arrival report is made even when the visitor identifies himself or herself as a delivery person of the delivery company providing the broadcast service of the delivery person information, the user can handle the visitor while taking precautions in consideration of a possibility that the visitor is an imposter posing as a delivery person.

Besides the tag IDs identifying the delivery persons in charge, the tag ID assigned to the wireless tag 1 carried by a relative or a friend may be pre-registered in the expected visitor storage unit 224A. When configured in such a manner, not only whether the visitor is an authenticated delivery person, but also whether the visitor is the pre-registered relative or friend can be identified and notified to the user as an identification result. For example, when the relative visits the house, the control unit 225 notifies the user that the visitor is the relative.

That is, the visitor identification device 2A is available as a device notifying a determination result as to whether the visitor is a pre-registered individual. The tag ID identifying an expected visitor may be registered by an operation of the user.

It is preferable to register the tag ID identifying a relative or a friend as a repeat tag. The repeat tag is a tag ID, data of which is not deleted from the expected visitor storage portion 224A after the tag ID is detected as a result in Step S303. The tag ID registered as the repeat tag may be deleted by an operation of the user.

Third Embodiment

A package identification system 100B as a third embodiment will now be described. The package identification system 100B is a system applied to a predetermined facility, for example, an individual house, to identify whether a package which is an object delivered to the facility is a pre-registered package and to notify an identification result to a user, such as a resident. The following will describe a case where the package identification system 100B is applied to an individual house as an example. It goes without saying that the package identification system 100B is not necessarily applied to an individual house and is also applicable to condominium buildings, commercial buildings, public offices, banks, museums, embassies, and so on.

Members furnished with functions same as the functions furnished to the members described in the first and second embodiments above are labelled with same reference numerals and a description is not repeated. In a case where only a part of configurations is described, configurations described in any preceding embodiment is applicable to a rest of the configurations.

Figure 12:
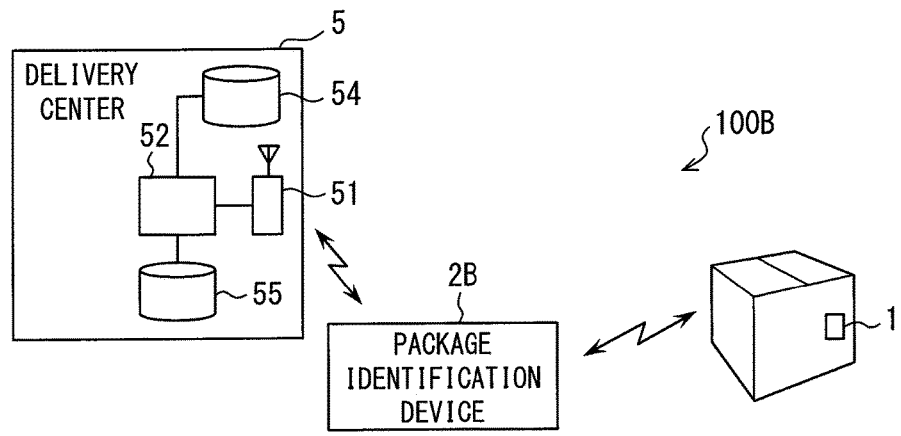
FIG. 12 is a block diagram showing a schematic configuration of a package identification system according to a third embodiment.
Figure 13:
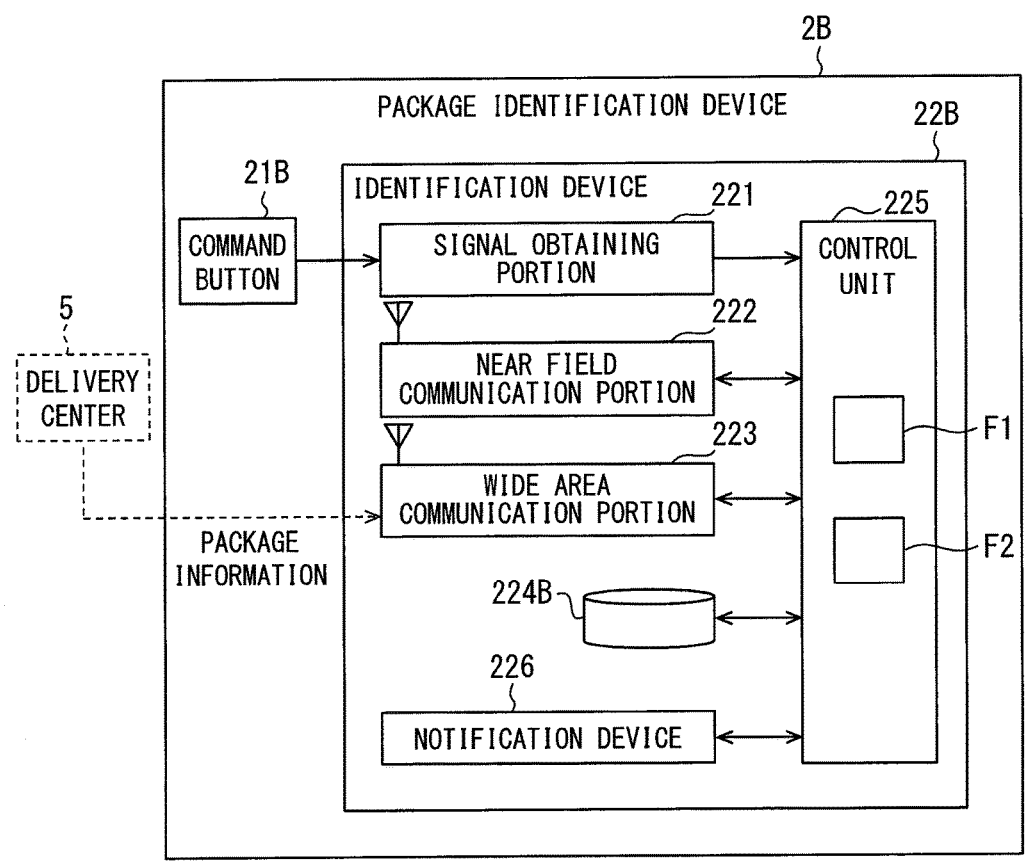
FIG. 13 is a block diagram showing a schematic configuration of a package identification device.

As is shown in FIG. 12, the package identification system 100B includes a wireless tag 1 attached to a package, a package identification device 2B installed to an individual house, and a delivery center 5 managing a delivery of the package. As is shown in FIG. 13, the package identification device 2B includes a command button 21B and an identification unit 22B. The delivery center 5 includes a wide area communication unit 51, a center-side control unit 52, a delivery status DB 54, and a customer DB 55. The package identification device 2B corresponds to the facility-side device.

The delivery status DB 54 is a database in which data indicating delivery statuses of packages is stored. Information on various packages, such as delivery statuses, is managed by slip numbers of the respective packages. Slip numbers are stored in the delivery status DB 54 in association with information specifying contents (types) of packages, desired delivery time zones, estimated delivery times, and delivery person numbers of delivery persons in charge, and so on. Also, slip numbers are stored in the delivery status DB 54 in association with tag IDs assigned to wireless tags 1 attached to packages.

In the third embodiment, the center-side control unit 52 transmits information on packages (hereinafter, referred to as package information) to the package identification device 2B installed to a house of a receiver of the package at predetermined timing. The package information only has to include the tag ID assigned to the wireless tag 1 attached to the package. As a more preferred example, the package information used herein includes a delivery company name and a content of the package in addition to the tag ID. The package information may further include an estimated delivery time or the like.

The package information only has to be broadcasted before packages are actually delivered to houses of receivers of the respective packages. Broadcast timing of the package information may be determined as needed within a range of restriction as above. For example, the package information may be broadcasted when a delivery service for the day beings.

The command button 21B is a button via which the user of the package identification unit 2B directs the package identification device 2B to identify whether a package delivered by a delivery person is the package notified beforehand by the delivery center 5. When depressed by the user, the command button 21B outputs a signal indicating a depressing action (hereinafter, referred to as a depression signal) to the identification unit 22B. The command button 21B may be provided to a position designed as needed (for example, near a front door).

In the third embodiment, as is shown in FIG. 13, the identification unit 22B includes a signal obtaining portion 221, a near field communication portion 222, a wide area communication portion 223, an expected package storage portion 224B, a control unit 225, and a notification device 226.

A communication area of the near field communication portion 222 may be designed as needed. For example, the communication area may be formed to cover a location where a delivered package is placed before the package is opened (for example, near the front door or in a home delivery box). The communication area functions as a predetermined region where a package should be placed to identify whether the package is the packaged notified beforehand by the delivery center 5. An area set as the communication area corresponds to a placement area.

The expected package storage portion 224B is realized by a rewritable non-volatile storage medium. A registration processing portion F1 cooperates with the wide area communication portion 223 and registers package information broadcasted from the delivery center 5 into the expected package storage portion 224B. Accordingly, the tag ID or the like assigned to the wireless tag 1 attached to the expected package is registered in the expected package storage portion 224B. The tag ID registered in the expected package storage portion 224B will be referred to as an expected package ID for ease of description.

In the third embodiment, a program causing a typical computer to function as the control unit 225 of the third embodiment (hereinafter, referred to as a package identification program) and the like are stored in a ROM of the control unit 225. The package identification program only has to be stored in a non-transitory tangible storage medium and may be stored in a storage medium other than the ROM in practice. Running the package identification program on the CPU corresponds to performing a method according to the package identification program.

The control unit 225 performs package identification related processing by running the package identification program stored in the ROM on the CPU. The package identification related processing is processing to determine whether a delivered package is the package notified beforehand by the delivery center 5 and to notify the user of a determination result. The package notified beforehand by the delivery center 5 corresponds to an authenticated package.

Figure 14:
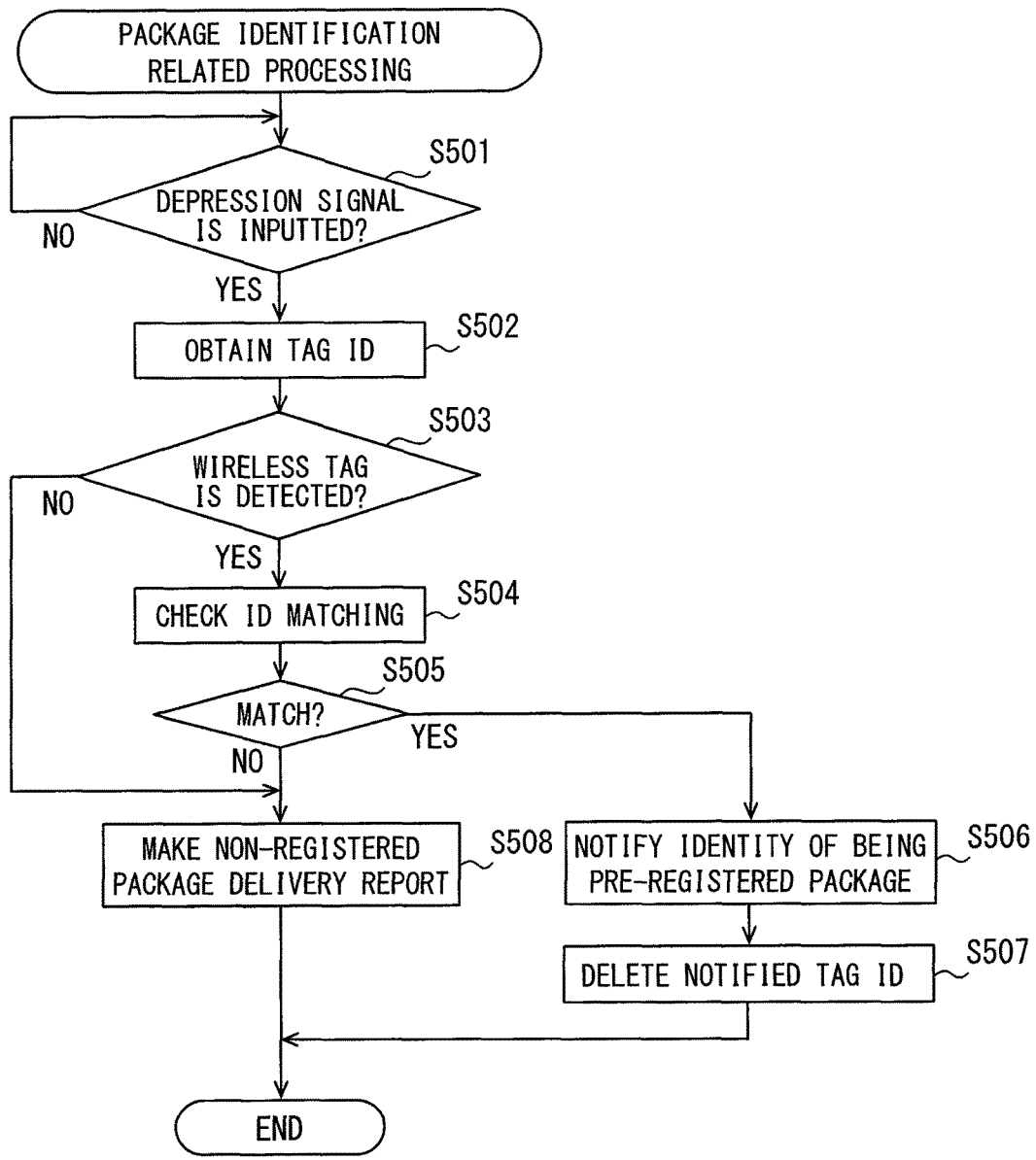
FIG. 14 is a flowchart of package identification related processing.

FIG. 14 shows a flowchart depicting steps of the package identification related processing. The flowchart of FIG. 14 (package identification related processing) may be started at timing designed as needed.

Herein, assume that more than one piece of package information is registered in the expected package storage portion 224B as an example. In a case where the user has multiple packages not to be subjected to the package identification related processing, the user adjusts positions of the multiple packages in such a manner that only one package is present in the communication area of the near field communication portion 222.

Firstly, the control unit 225 waits for an input of a depression signal from the depression button 21B in Step S501. When a depression signal is inputted from the depression button 21B, a positive determination is made in S501 and advancement is made to S502. The control unit 225 performing Step S501 corresponds to the event detection unit.

In Step S502, an inquiry signal is transmitted in cooperation with the near field communication portion 222. In a case where an identification signal is returned, a tag ID exhibited by the identification signal is saved in the RAM or the like each time an identification signal is returned. When a predetermined wait time elapses after the inquiry signal is transmitted, advancement is made to Step S503.

In Step S503, a determination is made as to whether the wireless tag 1 is detected as a result of Step S502. In other words, a determination is made as to whether the tag ID is obtained. In a case where the wireless tag 1 is not detected, a negative determination is made in Step S503 and the flow skips to Step S508. In a case where the wireless tag 1 is detected, advancement is made to Step S504.

In Step S504, all the expected package IDs registered in the expected package storage portion 224B are checked against the tag IDs obtained in Step S502 one by one. In a case where a matching check result in Step S504 reveals that an expected package ID matching any one of the tag IDs obtained in Step S502 is present, a positive determination is made in Step S505 and advancement is made to Step S506. Meanwhile, in a case where none of the expected package IDs matches any one of the tag IDs obtained in Step S502, a negative determination is made in Step S505 and advancement is made to Step S508. The control unit 225 performing Step S504 corresponds to a package identification unit.

In Step S506, information informing that a package subjected to the package identification related processing is the package notified beforehand by the delivery center 5 is outputted from the notification device 226 and advancement is made to Step S507. In the present embodiment, the user is notified not only of identity of the delivered package as the package notified beforehand but also a content of the package. When configured in such a manner, the user can know what type of a good is delivered before the package is opened. It is preferable that the user can designate particles to be notified in Step S506.

In Step S507, a deletion processing portion F2 deletes package information, such as the tag ID identifying the package notified in Step S506 (delivered package) from the expected package storage portion 224B. Then, the flow is ended. The control unit 225 performing Steps S506 and S507 corresponds to the notification processing unit.

In Step S508, information informing that the package subjected to the processing involving a series of steps are not the good registered in the expected package storage portion 224B is outputted from the notification device 226. Then, the flow is ended. Notifying the user of delivery of a good not registered in the expected package storage portion 224B will be referred to as a non-registered package delivery report for ease of description.

According to the configuration as above, the user can open the package with knowledge of whether the received package is the package notified beforehand by the delivery center 5. In a case where a non-registered package delivery report is made, the user can know that the received package is likely a suspicious substance.

In the above configuration, depression of the command button is adopted as an event that a delivered package is placed in the communication area functioning as the placement area. However, the present disclosure is not limited to the configuration as above. For example, in a case where the placement area is an inner space of the home delivery box and the home delivery box is furnished with a placement detection function of detecting a delivered package placed inside, a detection of the delivered package placed inside the home delivery box by the placement detection function may be adopted as an event that a delivered package is placed in the placement area.

What is claimed is:

1. An identification system identifying whether an individual present in a predetermined region is a registered individual who is preliminarily registered, the predetermined region being a detection area set within a facility, the identification system comprising:
   a facility-side device installed to the facility; and
   a transmitter carried by the registered individual and transmitting an identification signal containing identification information using a radio wave of a predetermined frequency band,
   wherein the facility-side device includes:
     an identification signal receiving device configured to receive the identification signal transmitted from the transmitter present within the detection area;
     an identification information storage unit in which identification information assigned to the transmitter carried by the registered individual is previously stored;
     an event detection unit detecting an occurrence of an event, the event triggering a processing which determines whether an individual present in the detection area is the registered individual; and
     an individual identification unit determining whether the individual present in the detection area is the registered individual by comparing the identification information, which is exhibited by the identification signal received by the identification signal receiving device during a detection time zone, with the identification information stored in the identification information storage unit, the detection time zone being determined with reference to a detection time of the occurrence of the event detected by the event detection unit and the detection time zone including at least the detection time of the occurrence of the event, the event detection unit detects an individual who enters the detection area as the event, the facility-side device further includes a crime prevention processing unit performing a crime prevention processing when the event detection unit detects the individual who enters the detection area, the individual identification unit determines whether the individual who enters the detection area is the registered individual by a comparison of the identification information, the crime prevention processing unit does not perform the crime prevention processing when the individual identification unit determines that the individual who enters the detection area is the registered individual, the identification information storage unit further stores mobile object identification information which is the identification information assigned to the transmitter, the transmitter is attached to a mobile object of the registered individual and the registered individual carries the mobile object when goes out, and the crime prevention processing unit performs the crime prevention processing in a case where the identification signal exhibiting the mobile object identification information is not received during the time zone even when the individual identification unit determines that the individual who enters the detection area is the registered individual.

2. The identification system according to claim 1, wherein:

the detection area is defined with respect to a residence where the registered individual resides and the detection area covers a predetermined range where the registered individual passes through when the registered individual returns to the residence;

the identification information stored in the identification information storage unit includes identification information of the registered individual, who is set as a protection target person by a user, and the identification information of the registered individual is stored in association with information for identifying the registered individual as the protection target person; and the facility-side device further includes a returned person determination unit determining whether an individual who returns to the residence is the protection target person according to the identification information of the registered individual in a case where the individual identification unit determines that the individual who enters the detection area is the registered individual, and a home return notice processing unit transmitting a home return notice informing that the protection target person returns to the residence to a pre-registered point of contact in a case where the returned person determination unit determines that the individual who returns to the residence is the protection target person.

3. An identification system employed in a facility and identifying whether a package delivered to the facility by a delivery person is a good notified beforehand by an authenticated sender, the identification system comprising:

a facility-side device installed to the facility; and a transmitter attached to an authenticated package which is a package dispatched from the authenticated sender, the transmitter transmitting an identification signal containing identification information using a radio wave of a predetermined frequency band, wherein the facility-side device includes:

an identification signal receiving device configured to receive the identification signal transmitted from the transmitter present within a predetermined placement area;

an expected package storage unit in which identification information assigned to the transmitter attached to the authenticated package is registered;

an event detection unit detecting, as an occurrence of an event, a placement of the package within the placement area;

a package identification unit determining whether the package placed within the placement area is the authenticated package by comparing the identification information, which is exhibited by the identification signal received by the identification signal receiving device during a detection time zone, with the identification information stored in the expected package storage unit, the detection time zone being determined with reference to a detection time of the occurrence of the event and the detection time zone including at least the detection time of the occurrence of the event; and a notification processing unit notifying a user that the package is the authenticated package in a case where the package identification unit determines that the package is the authenticated package, the notification processing unit further notifying the user that the package is not the authenticated package in a case where the package identification unit determines that the package is not the authenticated package.

4. The identification system according to claim 3, wherein:

the facility-side device further includes a wide area communication unit receiving package information including the identification information assigned to the transmitter attached to the authenticated package, the package information being broadcasted, via a wide area communication network, from a delivery center that manages delivery of the package, and a registration processing portion registering the package information received by the wide area communication unit into the expected package storage unit.

5. The identification system according to claim 4, further comprising a deletion processing portion deleting the package information of the package received by the user from the expected package storage unit.

* * * * *